United States Patent [19]

Han

[11] Patent Number: 5,003,702

[45] Date of Patent: Apr. 2, 1991

[54] MASTER GEAR TURNING ASSEMBLY

[76] Inventor: Sil Han, 321 Sunset Dr., Wilmette, Ill. 60091

[21] Appl. No.: 341,126

[22] Filed: Apr. 20, 1989

[51] Int. Cl.$^5$ .......................................... G01M 13/02
[52] U.S. Cl. .............. 33/501.19; 33/501.13; 73/162; 74/545; 74/625
[58] Field of Search ............ 33/501.7, 501.13, 501.19; 73/162; 74/625, 545

[56] References Cited

U.S. PATENT DOCUMENTS

| | | | |
|---|---|---|---|
| 1,263,472 | 4/1918 | Saurer | 33/501.13 |
| 1,282,348 | 10/1918 | Wirrer | 33/501.13 |
| 1,424,494 | 9/1873 | Miles | 74/625 |
| 1,445,631 | 2/1923 | Lotz | 33/501.19 |
| 2,014,668 | 9/1935 | Rinderknecht | 33/501.7 |
| 2,318,970 | 5/1943 | Richards | 33/501.13 |
| 2,585,528 | 2/1952 | Aeppli | 33/501.13 |
| 3,031,765 | 5/1962 | Muller | 33/501.13 |
| 3,126,166 | 3/1964 | Weinberg | 74/545 |
| 3,358,374 | 12/1967 | Jones, Jr. | 33/501.19 |
| 3,774,313 | 11/1973 | Occhialin et al. | 33/501.19 |

FOREIGN PATENT DOCUMENTS

0974188 11/1982 U.S.S.R. ................................ 73/162

Primary Examiner—Thomas B. Will
Attorney, Agent, or Firm—Ostrager & Chong

[57] ABSTRACT

A master gear turning assembly for a gear checking system of the slide type has a master gear on an arbor engaged wtih a workpiece gear and formed with off-center drive holes, a mounting cap with drive pins engaged in the off-center drive holes, and a device for turning the mounting cap to drive the master gear through the drive pins so that manual forces causing erroneous readings of the center distance between the two gears are avoided. The assembly can be an original or retrofit unit. One version has two drive pins with O-rings fitted in the holes of the master gear, a forward handle, and a transparent guard over the engagement area of the gears for operator safety. Another version has the forward mounting cap keyed to a hex bar extending through the arbor to a gear engaged with a right-angle handle drive or a motor drive unit.

27 Claims, 5 Drawing Sheets

MASTER GEAR TURNING ASSEMBLY

FIELD OF THE INVENTION

This invention generally relates to a master gear turning assembly, and more particularly, to one which has improved features for reliability, ease of use, and safety.

BACKGROUND ART

In conventional gear checking systems, a workpiece gear which has been machined with gear teeth on its periphery is tested for deviations of the machined surfaces within a predetermined tolerance range. In one widely-used form of gear checking system, a master gear which has been precisely machined is mounted on an arbor, and a workpiece gear 12 is brought into engagement with it on a spring-loaded slide. The master gear is then slowly turned by hand, and the displacements of the workpiece gear along the axis of the slide are measured on a gauge to determine whether deviations of the center distance between the master and workpiece gears lie within an acceptable tolerance range.

Figure 3:
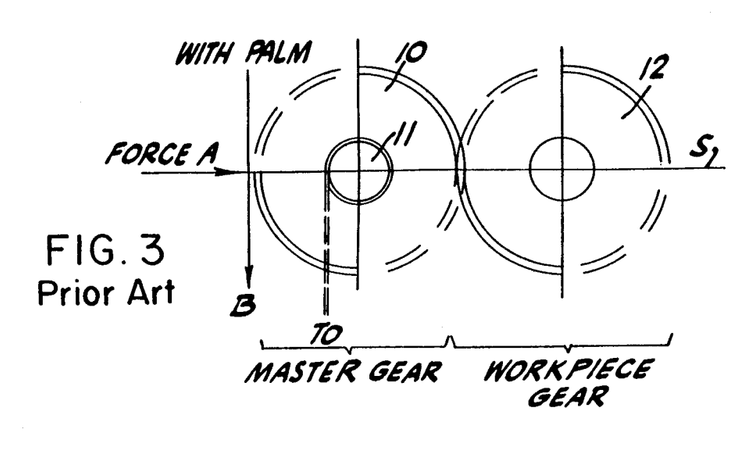
FIG. 3 is an illustration of the master gear turning arrangement of the prior art.

As illustrated in FIG. 3, such conventional gear checking systems have the problem that slight inaccuracies are introduced when the master gear 10 is turned manually by the operator. The arbor shaft 11 of the master gear usually has a slight clearance $T_0$, of the order of 0.0003 inch, for a metal-to-metal fit of the master gear thereon. When the operator applies a turning force in the tangential direction B with the palm of the hand to the master gear 10, a pushing force in the radial direction A or a pull in the tangential direction B may be directed on the master gear, which can result in erroneous displacements of the workpiece gear along the slide axis S through the clearance $T_0$ of the arbor shaft 11, or through friction between the master gear and the arbor shaft.

Thus, errors will be introduced into the measurement of the workpiece gear affecting the reliability of the measurement. Since manual turning of the master gear through 360 degrees requires repeated application of force by hand, the errors are repeated further and the checking time is increased. Moreover, the conventional system can be unsafe since the operator's hand might become caught in the area between the two gears. Motor drives have been employed to turn the master gear, but they can introduce vibrations into the measurement and are more expensive to produce. Such motor drives are engaged with a spindle through a drive belt or use a live spindle.

Therefore, it is a principal object of the invention to provide a gear turning assembly for a gear checking system which can be operated without introducing errors into the workpiece tolerance measurements. It is a further object to provide a master gear turning assembly which is inexpensive and simple in construction and can be easily retrofitted onto existing gear checking systems in wide use. It is further desired to provide an assembly which has improved safety features and advantages in terms of convenient operation either manually or with a motor drive.

SUMMARY OF THE INVENTION

In accordance with the invention, a master gear turning assembly for a gear checking system, of the type having a master gear rotatably engaged with a workpiece gear and means for measuring deviations of the center distance between the two gears as the master gear is turned, comprises: a master gear arbor having an arbor shaft projecting in a forward direction along a center turning axis; the master gear having a central bore formed therethrough by which it is rotatably mounted on the master gear arbor shaft, wherein said master gear has at least one off-center hole formed in a forward surface thereof facing in the forward direction; a mounting cap mounted to the forward surface of the master gear in alignment with the center turning axis of the master gear arbor shaft and having at least one drive pin projecting in a rearward direction opposite to the forward direction which is received in the off-center hole in the master gear; and turning means for turning the mounting cap which in turn drives the master gear through the at least one drive pin.

The invention encompasses an assembly that is part of an original gear checking system as well as one which is retrofit onto an existing system. In one embodiment of the invention, the mounting cap has two diametrically opposed drive pins which have O-rings on their ends for a close, shock-absorbing fit in the off-center holes in the master gear, and a handle for manual turning by the operator. The mounting cap rotatably receives the forward end of the shaft of the arbor which is mounted on the master gear arbor mounting block of the gear checking system. A transparent guard is provided with the mounting cap extending over the engagement area of the gears to prevent the operator's hand from being caught in the gears.

In another embodiment, the forward mounting cap is keyed to a hex bar which extends rearwardly through the master gear arbor to a bevel gear assembly, and a right-angle drive unit is engaged with the bevel gear assembly to allow manual turning by a handle at one side of the gear checking system in a plane perpendicular to the turning plane of the master gear. The right-angle drive may also be driven by an external motor drive instead of a handle.

A further embodiment uses the arbor and bearing assembly with a central hex bar through the arbor to turn one end of workpiece shaft gear held in a C-shaped holding member for rotatable engagement with a master gear. Another important feature of the invention is the use of a ball bushing for the bearing dimensioned for a slight interference fit with the gear or gear holding member and the arbor shaft in order to eliminate the clearance yet allow for smooth turning.

Other objects, features, and advantages of the present invention will become apparent from the following detailed description of the best mode of practising the invention when considered in conjunction with the drawings, as follows:

DESCRIPTION OF THE PREFERRED EMBODIMENTS

Figure 1:
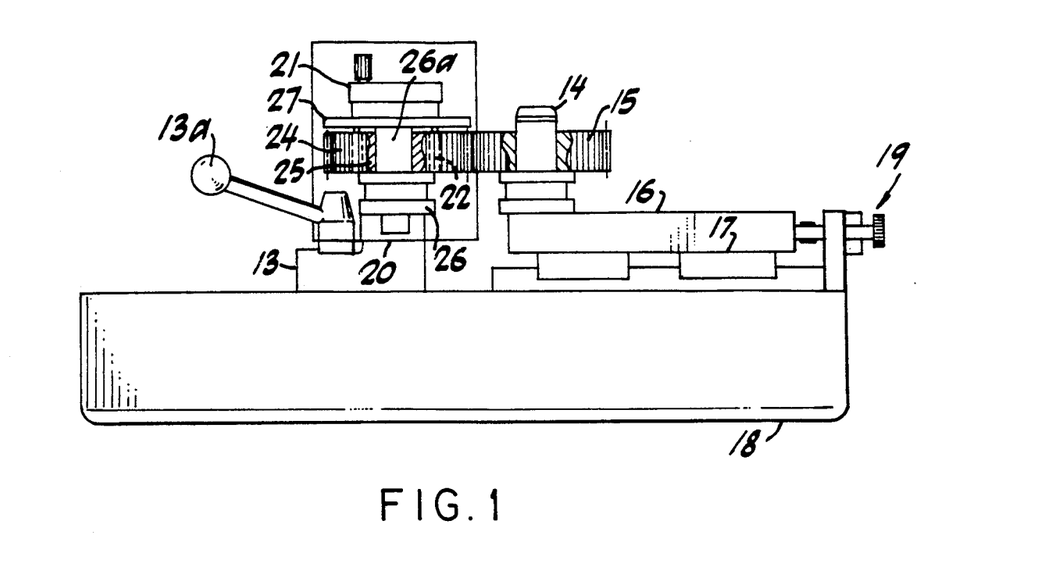
FIG. 1 is a sectional front view of one embodiment of the master gear turning assembly as provided on a gear checking system in accordance with the invention.
Figure 2:
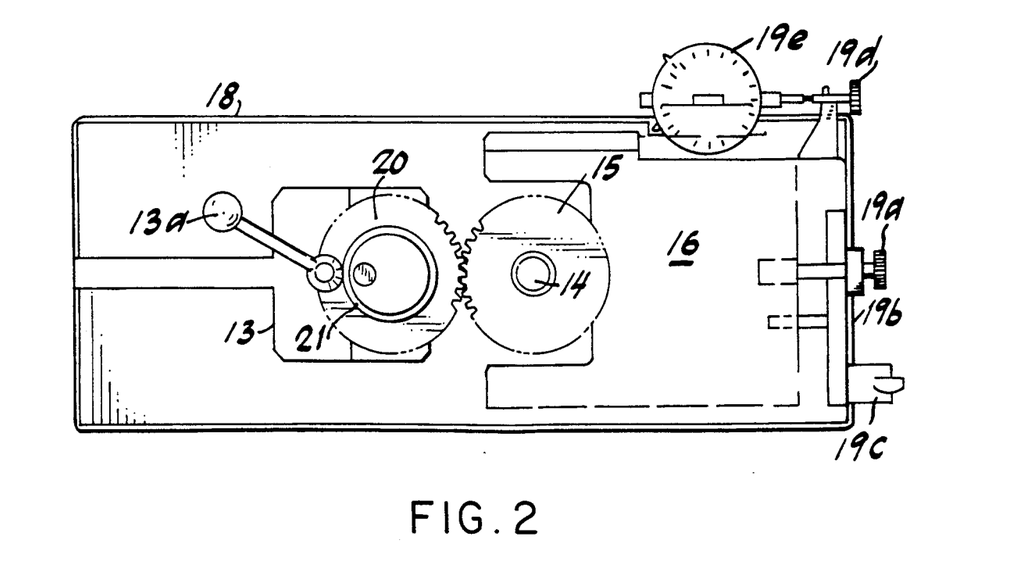
FIG. 2 is a top view of the master gear turning assembly and gear checking system shown in FIG. 1.

Referring to FIGS. 1 and 2, a master gear turning assembly, designated by the rectangle labelled 20, includes a master gear 24 rotatably mounted on a ball bushing 25 on the shaft 26a of an arbor 26 held on an arbor mounting block 13 of an otherwise conventional gear checking system of the stud arbor and slide type. One example of this type of gear checking system is the ITW Model 2275 sold by ITW Zero Systems, Chicago, Ill.

The gear checking system may have a locking handle 13a which tightens or loosens the master gear arbor mounting block 13 for interchanging the arbor 26 and/or the master gear 24. A workpiece gear 15 is carried rotatably on an arbor 14 mounted on a slide 16. The slide 16 is slidably mounted on bearing blocks 17 for movement relative to a base 18. The slide is biased toward the master gear by a spring with an adjustable assembly 19 including an adjustment screw, indicated at 19a, so that the workpiece gear 15 can be brought into engagement with the master gear 24 under spring pressure. A limit screw 19b adjustably limits the travel of the slide 16, and a retractor 19c controls the engagement and disengagement of the workpiece gear. When the master gear 24 is turned, the workpiece gear 15 turns in engagement therewith, and center distance deviations through the mating surfaces of the gears are reflected as displacements of the slide 16. The movements of the slide are communicated through a sensing screw 19d mounted on the slide to the input of a gauge 19e. The other parts and further operation of the conventional gear checking system are not described in further detail, as they are deemed to be well known.

Figure 4A:
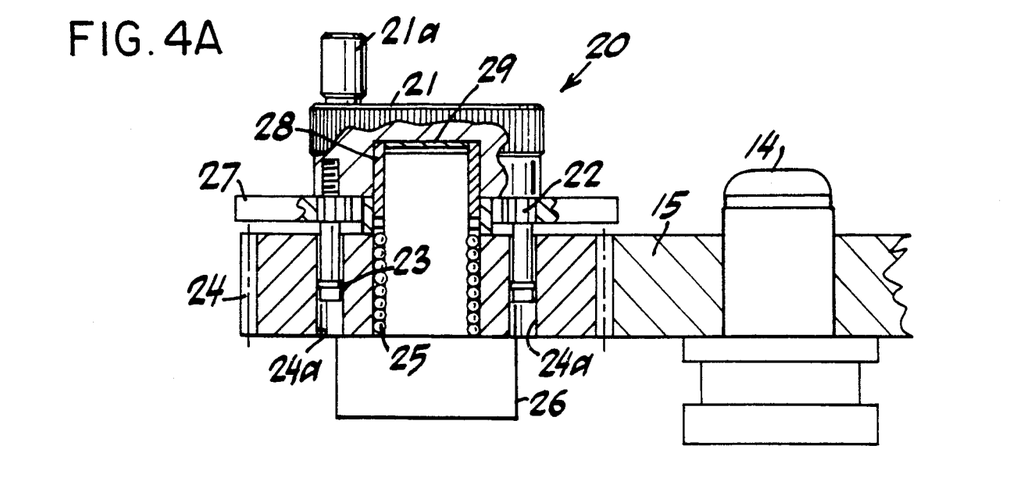
FIG. 4A is a detailed sectional view of the master gear turning assembly of FIG. 1.
Figure 4B:
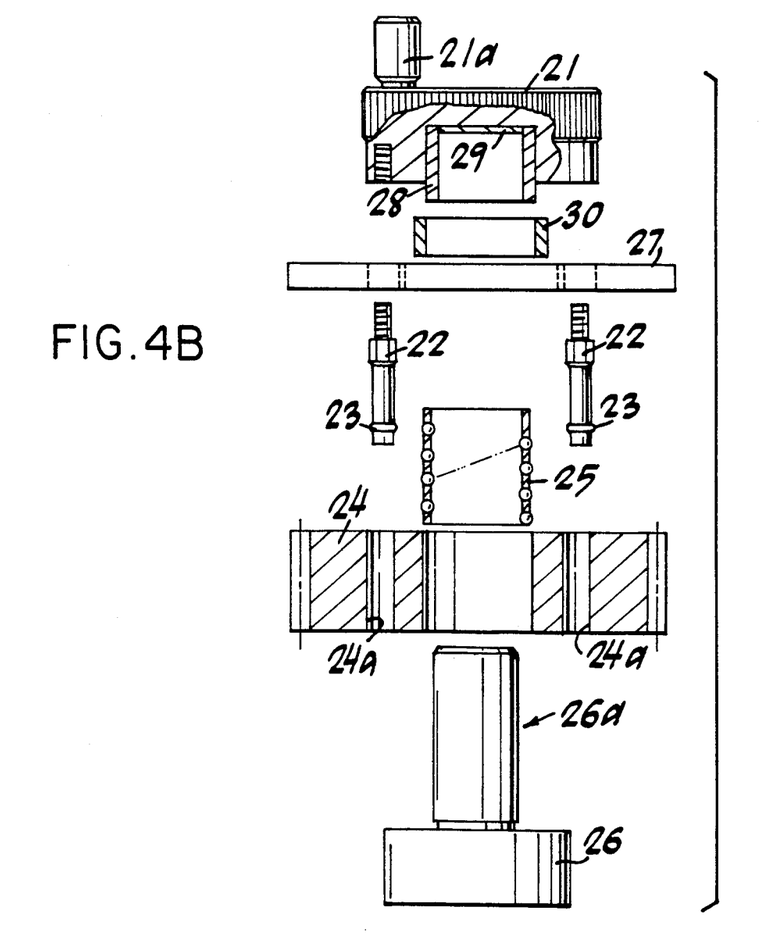
FIG. 4B is an exploded sectional view of the components of the assembly.

In FIGS. 4A and 4B, the master gear turning assembly 20 of the invention is shown in greater detail having a mounting cap 21 mounted to the master gear 24 through drive pins 22 which are inserted in corresponding off-center holes 24a in the master gear. The drive pins 22 have a diameter slightly smaller than the inner diameter of the holes 24a, and elastomer O-rings are provided on their ends for a close, shock-absorbing fit in the holes in the master gear. Two diametrically opposed driving pins are shown, however, a single pin or more than two pins may also be used. The mounting cap 21 and master gear 24 are rotatably mounted on the shaft 26a of the arbor 26 through an upper bearing 28 and the lower ball bushing 25.

The mounting cap 21 has a knob or handle 21a facing in a forward direction toward the operator which is offset from the center axis in order to allow manual turning of the cap, and thereby the master gear. Manual turning of the knob 21a of the mounting cap 21 applies the turning force through the drive pins 22 and shock-absorbing O-rings 23 substantially only about the center axis of the master gear. This prevents forces from being applied to the master gear which would generate measurement errors. The handle 21a conveniently allows the master gear to be turned through 360 degrees with one smooth motion, thereby avoiding spurious readings due to repeated palm motions as in the conventional system. A transparent guard 27, which is larger than the mounting cap and extends over the engagement area between the gears, prevents the operator's hand from being caught in the gears while allowing the operator to see the turning of the master gear and its engagement with the workpiece gear.

The master gear turning assembly can be installed in original gear checking machine, or it can be retrofitted onto an existing machine by removing the existing arbor and installing the arbor, bearing, and mounting cap of a retrofit kit with the master gear. The existing master gear can be used by forming the drive holes therein, or a master gear having preformed holes may be substituted.

As shown more clearly in FIG. 4B, the mounting cap is formed, in a practical example, with a hardened steel washer 29 as a thrust bearing in a central bore of the mounting cap 21, and an oil-impregnated bronze bearing 28 press-fitted in the bore having an internal diameter slightly larger than the arbor shaft 26a so that the latter can rotate therein. A dirt seal 30 is provided on the outside of the bearing 28. The drive pins 22 are inserted through retaining holes in the transparent guard 27 and fixed into mounting holes formed in the mounting cap 21.

The cylindrical ball bushing 25 is pressed in the central bore of the master gear 24, and the arbor shaft 26a is inserted therethrough. The mounting cap is installed on the master gear by inserting the projecting end of the arbor shaft 26a into the upper bearing 28, and inserting the O-ring ends of the drive pins 22 in the holes 24a in the master gear. The assembly 20 is then securely mounted to the arbor mounting block 13 to complete the retrofit of an existing machine or its installation in original equipment.

An important feature of the invention is the provision of the bearing 25 mounted between the master gear arbor shaft and the central bore of the master gear which is dimensioned so that there is substantially zero clearance between the parts when they are mounted together. Current gear checking systems mount the master gear directly onto the arbor shaft with a clearance of about 0.0003 inch. The clearance becomes an error factor in the tolerance measurements, and the metal-to-metal contact of the master gear with the arbor shaft can create undesirable friction.

The preferred bearing is a ball bushing of the type having a cylindrical bronze cage with a plurality of ball bearings carried therein. The ball bushing dimensions are selected for a slight interference fit between the central bore of the master gear and the master gear arbor shaft. For example, the thickness of the ball bushing is selected to overlap by about 0.0002 inch larger than the difference between the outer diameter (OD) of the arbor shaft and the inner diameter (ID) of the central bore of the master gear. Master gears for gear checking systems typically have standard bore IDs of 1.0 inch or 1.25 inch. When the ball bushing is installed in the master gear and onto the arbor shaft, the interference fit is taken up by the ball bearings of the bushing becoming slightly compressed into an ellipsoid shape. This condition removes any clearance or wobble between the master gear and the arbor shaft, thus preventing it from becoming an error factor in the workpiece tolerance measurements. At the same time, the ball bearings provide a smooth rolling action for the master gear.

Suitable ball bushings are sold or custom designed by Chicago Bearing Manufacturing Company, Chicago, Ill. Such ball bushings have been used for guiding axially sliding parts of machines such as punch presses, but have not been used heretofore for the purposes and effects described above.

Figure 5A:
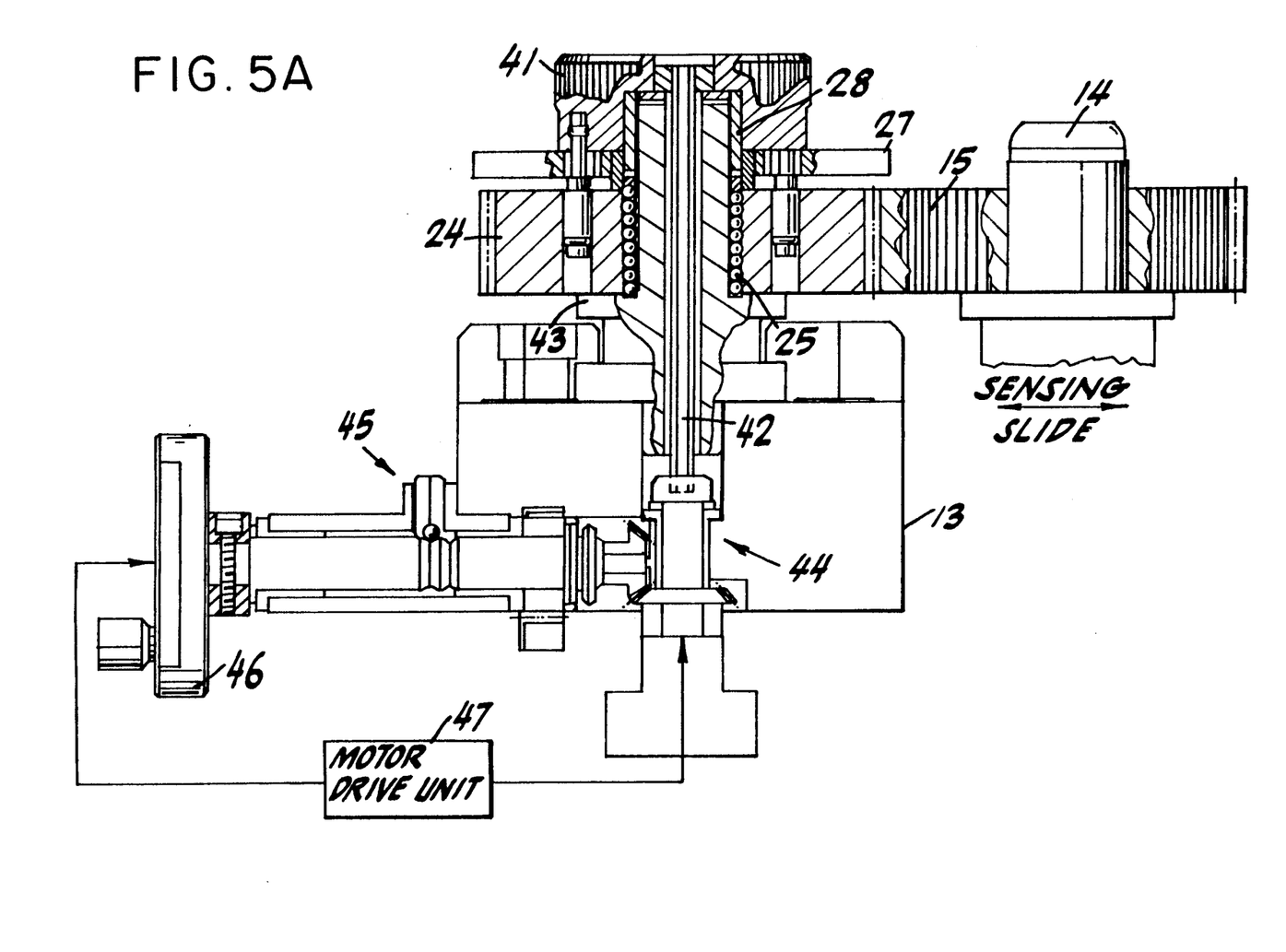
FIG. 5A is a detailed sectional view of another embodiment of the master gear turning assembly of the invention.
Figure 5B:
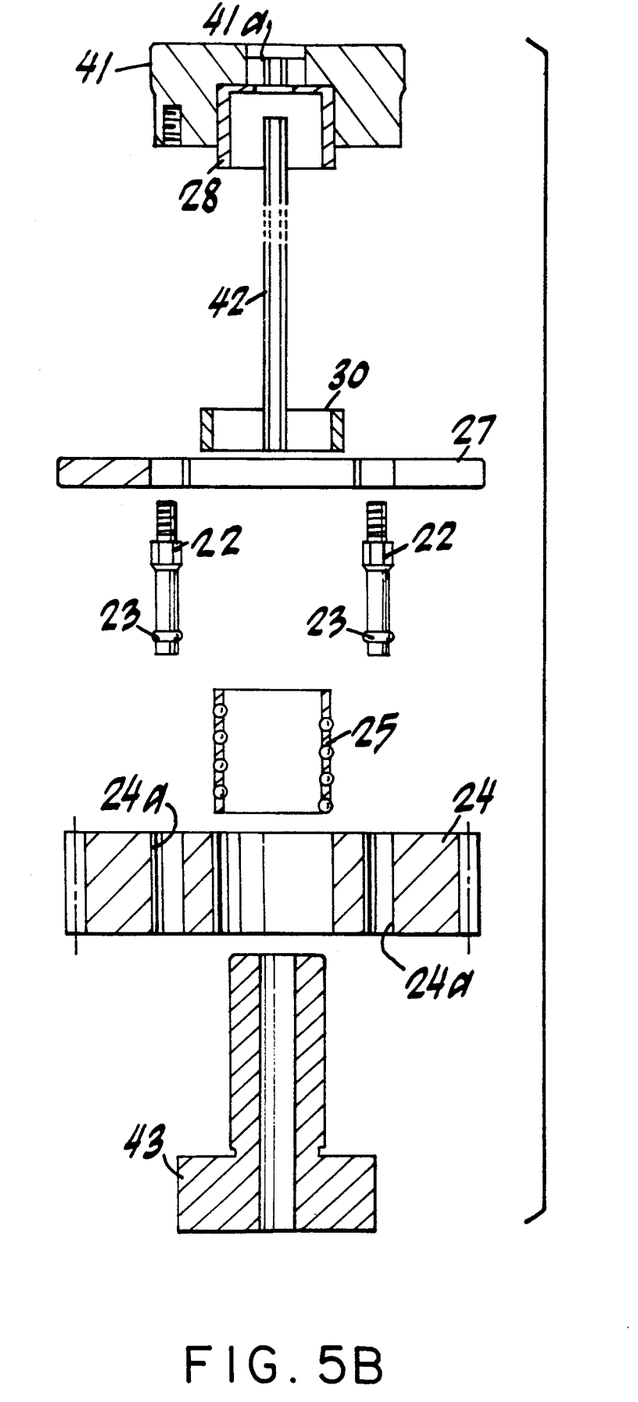
FIG. 5B is an exploded sectional view of the components of the assembly.

Another embodiment of the invention shown in FIGS. 5A and 5B has a forward mounting cap 41 fixed to the master gear 24 through the drive pins 22, and includes the guard 27, upper bearing 28, lower bushing 25, and seal 30 as described above. However, the mounting cap 41 is keyed through a hex slot 41a to a hex bar 42 which passes rearwardly through a bore in the arbor 43 and is engaged with a bevel gear assembly 44 on the opposite side of the arbor mounting block 13. The arbor 43 is secured in position to the arbor mounting block 13.

The bevel gear assembly 44 includes a bevel gear engaged with a right-angle drive unit 45 which extends to one side of the gear checking system. A handle 46 is provided to allow manual turning from the side of the gear checking system in a plane perpendicular to the turning plane of the master gear, instead of from the front as in the previously described embodiment. The side position of the handle may be more ergonometric and safer for an operator. Alternatively, the right-angle drive may be driven by an external motor drive 47, indicated schematically in FIG. 5B, instead of the handle 46. Since the driving force of the motor is applied through the bevel gear assembly, to the mounting cap 41, then to the master gear 24 through the O-ring ends of the drive pins 22, the problem of spurious readings due to motor vibrations is significantly reduced. The external motor can be conveniently mounted to the side of the gear checking system or the rear of the arbor mounting block.

Figure 6A:
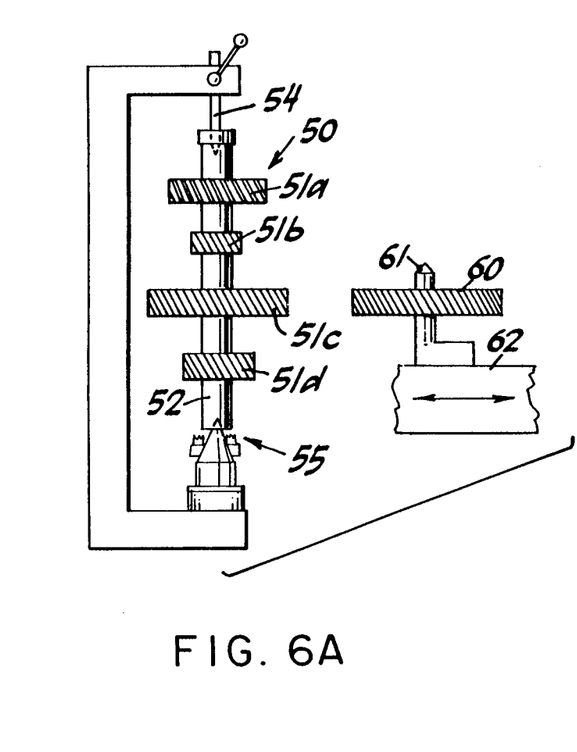
FIG. 6A is a schematic sectional view of a further embodiment of a gear turning assembly as applied to a workpiece shaft gear in a holding member.

As shown schematically in FIG. 6A, another variation of the invention is used for turning a workpiece shaft gear 50 having a plurality of gear elements 51a to 51d on a shaft 52 in rotational engagement with a master gear 60. The workpiece shaft gear 50 is mounted in a C-shaped holding member 53 with upper and lower holding elements 54, 55. The master gear 60 is mounted on an arbor 61 carried on a slide which moves laterally to engage or disengage the master gear with a selected gear element of the workpiece shaft gear.

Figure 6B:
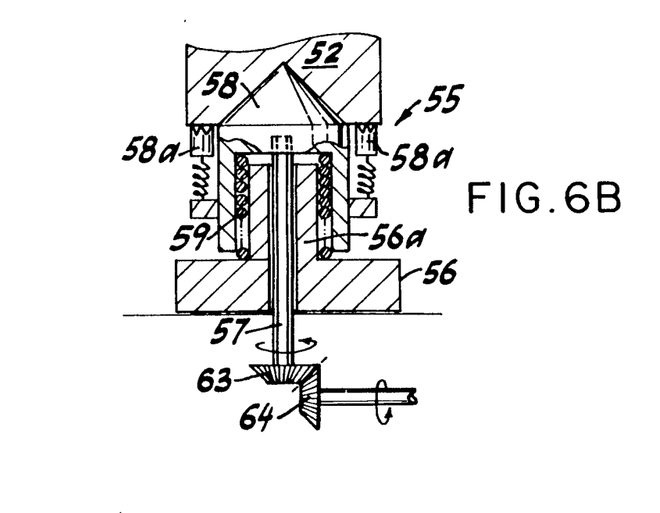
FIG. 6B is a detailed sectional view of the arbor and turning mechanism.

The lower holding element 55 is shown in greater detail in FIG. 6B including an arbor 56 having an arbor shaft 56a with a central bore through which a hex bar 57 passes. A collet 58 having a V-shaped end is engaged in a corresponding V-shaped recess in the shaft of the shaft gear 52. The collet 58 has a central bore which receives the arbor shaft 56a provided with a ball bushing 59. The collet 58, ball bushing 59, and arbor shaft 56a are dimensioned to have an interference fit as described previously. The collet may have a spring-loaded jaw 58a for holding the shaft gear 52 without slippage. One end of the hex bar 57 is keyed in a hex slot in the collet 58 along the center turning axis. The hex bar is connected to a bevel gear at the other end 63 which is turned by a drive gear 64 manually or by motor drive. This structure allows the workpiece shaft gear to be turned without applying force by hand to the shaft gear directly. Since the turning force is applied through the hex bar only about the center turning axis, and since the interference fit of the ball bushing removes any room for wobble or clearance, errors in the tolerance measurements are prevented.

Numerous modifications and variations are of course possible in light of the above disclosure of the basic principles of the invention. It is intended that all such modifications and variations which may be devised be considered within the spirit and scope of the invention as defined in the appended claims.

What is claimed is:

1. A master gear turning assembly for a gear checking system, which is of the type having a master gear rotatably engaged with a workpiece gear and means for measuring deviations of the center distance between the two gears as the master gear is turned, comprising:

a master gear arbor having an arbor shaft extending along a center turning axis and projecting in a forward direction facing toward an operator of the gear checking system;

the master gear having a central bore formed therethrough by which it is rotatably mounted on the master gear arbor shaft for engagement with the workpiece gear, wherein said master gear has at least one off-center hole formed in a forward surface thereof facing in the forward direction;

a mounting cap mounted to said master gear arbor shaft adjacent the forward surface of the master gear in alignment with the center turning axis of the master gear arbor shaft and having at least one drive pin projecting in a rearward direction opposite to the forward direction which is received in the off-center hole in the master gear; and turning means for turning the mounting cap which in turn drives the master gear through the at least one drive pin, wherein said mounting cap, drive pin, and turning means allow turning of said master gear through a turning force directed about said center turning axis and eliminate the necessity for turning by manual contact with said master gear.

2. A master gear turning assembly according to claim 1 formed as a retrofit assembly, wherein said gear checking system is an existing gear checking system and said master gear arbor is mounted to an arbor mounting block of said existing gear checking system.

3. A master gear turning assembly according to claim 1, wherein said mounting cap has two diametrically-opposed drive pins disposed on each side of the center turning axis of the master gear, and said master gear has two corresponding off-center holes.

4. A master gear turning assembly according to claim 1, wherein said drive pin has a diameter slightly smaller than the internal diameter of the off-center hole in the master gear, and has an elastomer O-ring on the end thereof for a close, shock-absorbing fit in the off-center hole in the master gear.

5. A master gear turning assembly according to claim 1, wherein said mounting cap includes a handle projecting in the forward direction for turning by an operator.

6. A master gear turning assembly according to claim 1, wherein said mounting cap includes a center recess and a bearing in the center recess for rotatably receiving a projecting forward end of the master gear arbor shaft therein.

7. A master gear turning assembly according to claim 1, wherein a transparent guard having a planar shape is mounted with said mounting cap and extends over the engagement area of the gears to prevent an operator's hand from being caught in the gears.

8. A master gear turning assembly according to claim 1, wherein said mounting cap has an engagement recess formed aligned with the center turning axis, said turning means including a drive bar having one end held in the engagement recess and its other end extending in the rearward direction through a bore in the master gear arbor and arbor shaft along the center turning axis, and a drive gear engaged with the other end of the drive bar for turning the mounting cap and, thereby, the master gear.

9. A master gear turning assembly according to claim 8, wherein said drive gear includes a bevel gear, and said turning means includes a right-angle drive unit engaged with the bevel gear and having a handle projecting to one side of the gear checking system which is turned by an operator in a plane perpendicular to the turning plane of the master gear.

10. A master gear turning assembly according to claim 8, wherein said drive gear is engaged with a motor drive unit mounted to the gear checking system.

11. A master gear turning assembly according to claim 1, wherein said assembly further includes a bearing mounted between the master gear arbor shaft and the central bore of the master gear, wherein said bearing, said master gear arbor shaft, and said central bore of the master gear are dimensioned so that there is substantially zero clearance therebetween.

12. A master gear turning assembly according to claim 11, wherein said bearing is a ball bushing having a cylindrical cage with a plurality of ball bearings carried therein, and said ball bushing is dimensioned for a slight interference fit between the central bore of the master gear and the master gear arbor shaft.

13. An improved gear checking system including a base, a master gear arbor mounted on the base having an arbor shaft on which a master gear is rotatably mounted, a workpiece gear arbor mounted on the base having an arbor shaft on which a workpiece gear is rotatably mounted, means for slidably biasing the workpiece gear in rotatable engagement with the master gear, and means for measuring deviations in the center distance between the two gears as one of the gears is turned, wherein the improvement comprises:
the arbor for the one gear which is turned having its arbor shaft projecting in a forward direction along a center turning axis;
a bearing, mounted on the arbor shaft for the one gear which is turned, for rotatably mounting the one gear thereon, wherein said bearing, said one gear, and said arbor shaft are dimensioned so that there is substantially zero clearance between them; and
turning means engaged with the one gear for directing a turning force substantially evenly about the center turning axis of the one gear,
whereby said substantially zero clearance between the bearing, the one gear, and the arbor shaft, and said directing of the turning force substantially evenly about the center turning axis of the one gear ensure that spurious forces are not generated in a direction away from the center turning axis and erroneous center distance measurements are prevented.

14. An improved gear checking system according to claim 13, wherein the master gear is the one gear which is turned and has at least one off-center hole formed in a forward surface thereof facing in the forward direction, said system further comprising a mounting cap mounted to said arbor shaft adjacent the forward surface of the master gear in alignment with the center turning axis of the arbor shaft for the master gear and having at least one drive pin projecting therefrom in a rearward direction opposite to the forward direction, wherein a projecting end of the drive pin is received in the off-center hole in the master gear, and said turning means including drive means for turning the mounting cap which in turn drives the master gear through the at least one drive pin.

15. An improved gear checking system according to claim 14, wherein said mounting cap has an engagement recess formed on the center turning axis, said system further including a drive bar having one end held in said engagement recess and its other end extending in the rearward direction through a bore in the arbor and arbor shaft for the master gear, and said turning means including a drive gear engaged with the other end of the drive bar for turning the mounting cap.

16. An improved gear checking system according to claim 15, wherein said drive gear includes a bevel gear, and further comprising a right-angle drive unit engaged with the bevel gear and having a handle projecting to one side of the gear checking system which is turned by an operator in a plane perpendicular to the turning plane of the master gear.

17. An improved gear checking system according to claim 15, wherein said drive gear is engaged with a motor drive unit mounted to the gear checking system.

18. An improved gear checking system according to claim 13, wherein said bearing is a ball bushing having a cylindrical cage with a plurality of ball bearings carried therein, and said ball bushing is dimensioned for a slight interference fit between a central bore formed through said one gear and said arbor shaft.

19. An improved gear checking system according to claim 13, wherein the workpiece gear is the one gear which is turned, said system further including an engagement member engaged with the workpiece gear for rotation therewith on the center turning axis, said engagement member having a central bore for mounting on the bearing and arbor shaft for the workpiece gear and an engagement recess positioned on the center turning axis, said turning means including a drive bar having one end held in the engagement recess and its other end extending in the rearward direction through a bore in the arbor and arbor shaft for the workpiece gear along the center turning axis, and a drive gear engaged with the other end of the drive bar for turning the drive bar and, thereby, the workpiece gear.

20. An improved gear checking system according to claim 19, wherein said workpiece gear is a shaft gear having a plurality of gear members thereon, said system further including a holding member for rotatably mounting the shaft gear by its opposite ends, said engagement member is engaged with one end of the workpiece shaft gear, and said arbor for the workpiece shaft gear is supported on the holding member for rotatably mounting the one end of the workpiece shaft gear.

21. A method of retrofitting a master gear turning assembly on an existing gear checking system, which is of the type having a manually-turned master gear on a master gear arbor rotatably engaged with a workpiece gear on a workpiece gear arbor, comprising the steps of:
replacing the existing master gear arbor with a retrofit master gear arbor having an arbor shaft projecting in a forward direction along a center turning axis;

forming at least one off-center hole in a forward surface of the master gear for the gear checking system facing in the forward direction;

mounting a bearing on the master gear arbor shaft and the master gear on the bearing by a central bore thereof, wherein said bearing and said master gear arbor shaft are dimensioned so that there is substantially zero clearance between them and the central bore of the master gear; and mounting a retrofit mounting cap to said arbor shaft adjacent the forward surface of the master gear in alignment with the center turning axis of the master gear arbor shaft, wherein said mounting cap has at least one drive pin projecting in a rearward direction opposite to the forward direction which is received in the off-center hole in the master gear, and means for turning the mounting cap which in turn drives the master gear through the at least one drive pin.

22. A retrofit kit for retrofitting a master gear turning assembly on an existing gear checking system having a manually-turned master gear on an existing master gear arbor rotatably engaged with a workpiece gear on a workpiece gear arbor, comprising:

a retrofit master gear arbor for replacing the existing master gear arbor, said retrofit master gear arbor having an arbor shaft projecting in a forward direction along a center turning axis;

a retrofit bearing adapted to be mounted on the retrofit master gear arbor shaft and to have the master gear mounted thereon by a central bore thereof, wherein said retrofit bearing and said retrofit master gear arbor shaft are dimensioned so that there is substantially zero clearance between them and the central bore of the master gear; and a retrofit mounting cap adapted to be mounted to the forward surface of the master gear in alignment with the center turning axis of the retrofit master gear arbor shaft, wherein said retrofit mounting cap has at least one drive pin projecting in a rearward direction opposite to the forward direction which is adapted to be received in an off-center hole formed in the master gear, and means for turning the retrofit mounting cap so that it in turn drives the master gear through the at least one drive pin, wherein said retrofit bearing is dimensioned for a slight interference fit between the central bore of the master gear and the retrofit master gear arbor shaft.

23. A retrofit kit according to claim 22, wherein said retrofit mounting cap has two diametrically-opposed drive pins disposed on each side of the center turning axis of the master gear for fitting in two corresponding off-center holes in the master gear.

24. A retrofit kit according to claim 22, wherein said at least one drive pin has a diameter slightly smaller than the internal diameter of the off-center hole in the master gear, and an elastomer O-ring on the end thereof for a close, shock-absorbing fit in the off-center hole in the master gear.

25. A retrofit kit according to claim 22, wherein said retrofit mounting cap has a handle projecting in the forward direction for turning by an operator.

26. A retrofit kit according to claim 22, wherein said retrofit mounting cap has a center recess and a bearing in the center recess for rotatably receiving a projecting forward end of the retrofit master gear arbor shaft therein.

27. A retrofit kit according to claim 22, wherein said retrofit mounting cap includes a transparent guard adapted to be extended over the engagement area of the gears to prevent the operator's hand from being caught in the gears.

* * * * *